Aug. 13, 1963  W. BREY  3,100,731
METHOD AND APPARATUS FOR JOINING SHEET MATERIAL
Filed March 15, 1957  8 Sheets-Sheet 8
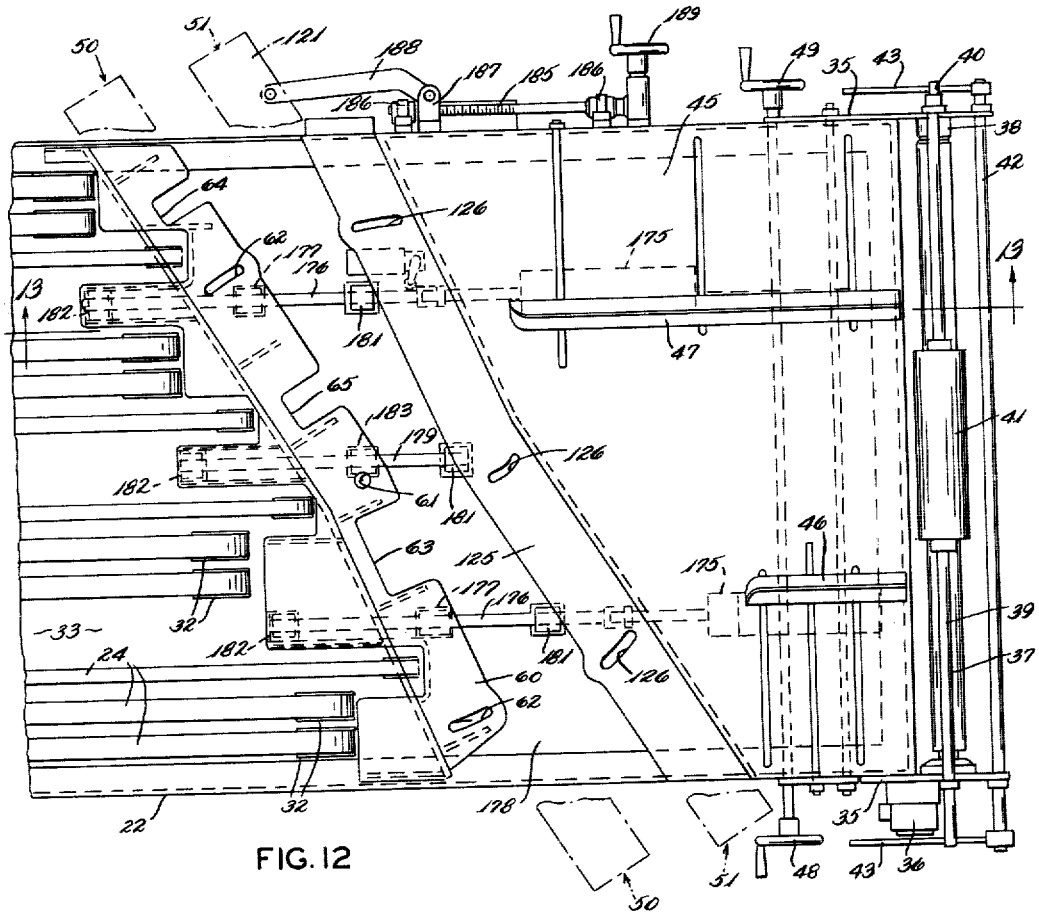
FIG. 12
FIG. 13
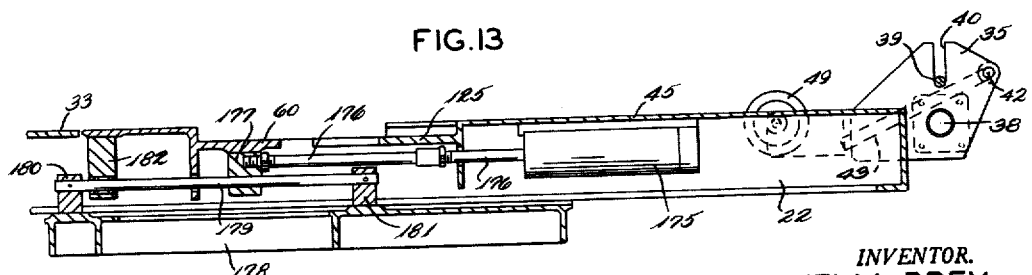
INVENTOR.
WILHELM BREY
BY W. A. Fraser
ATTY.

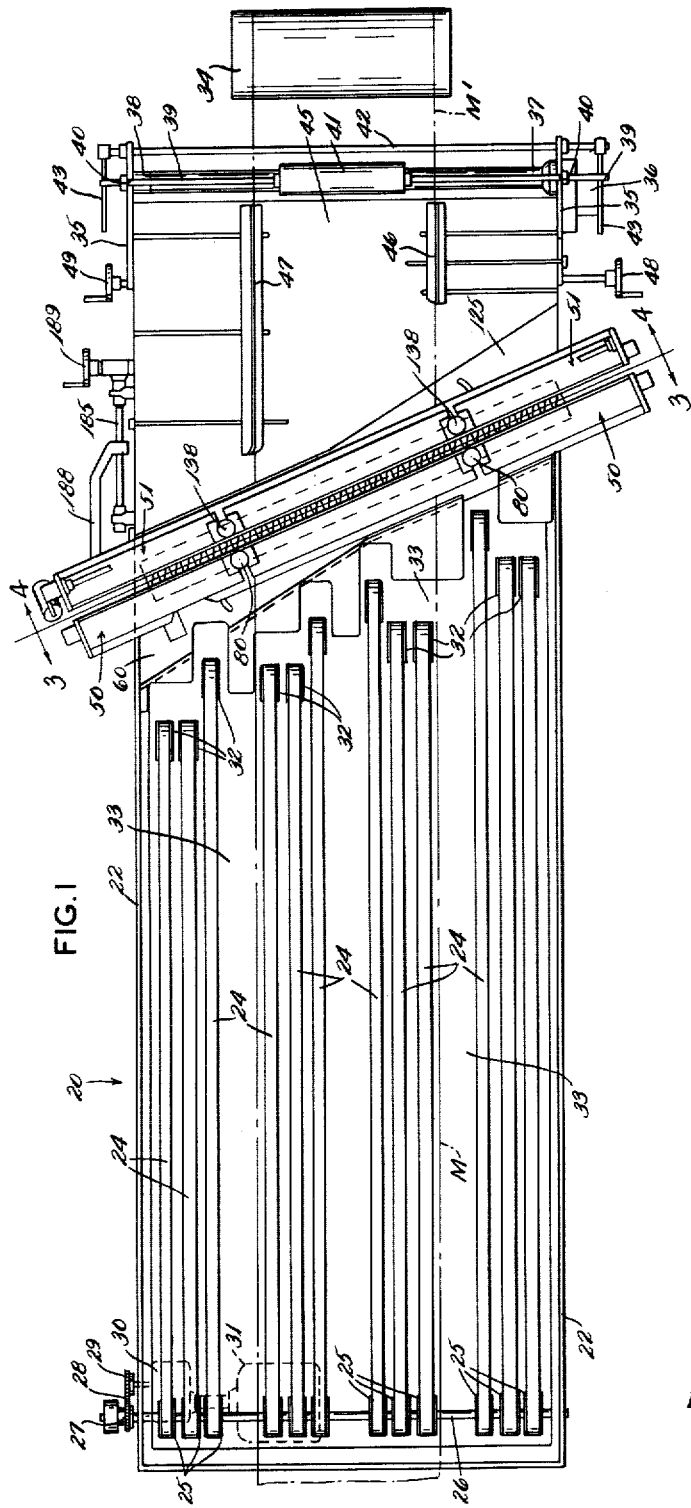

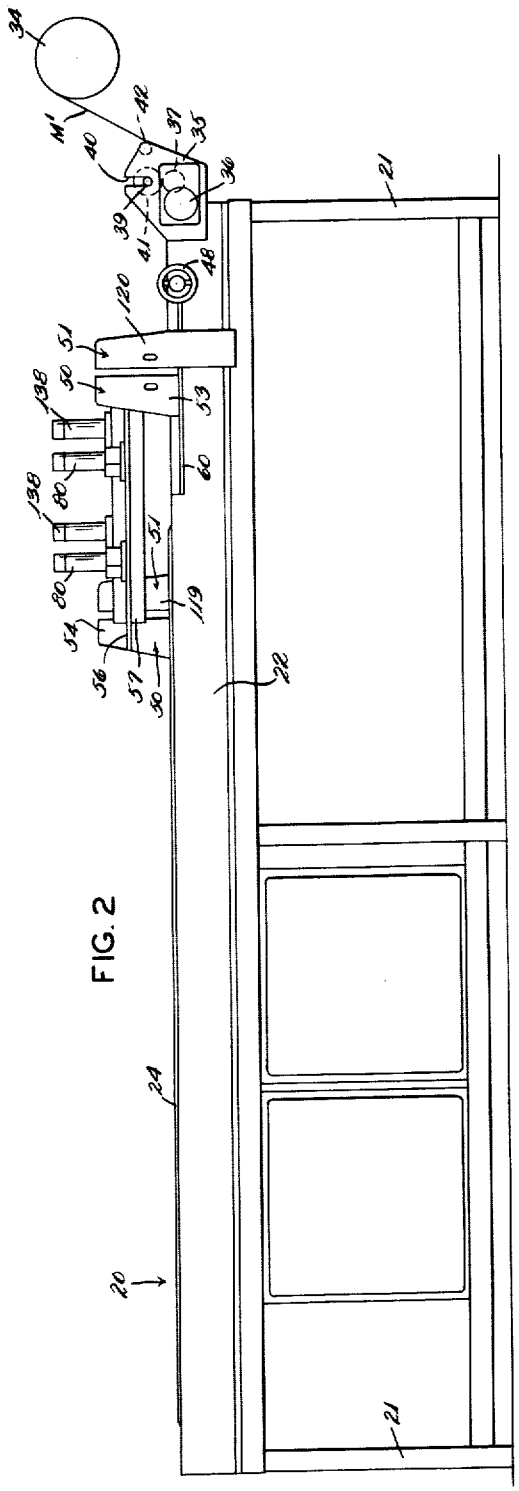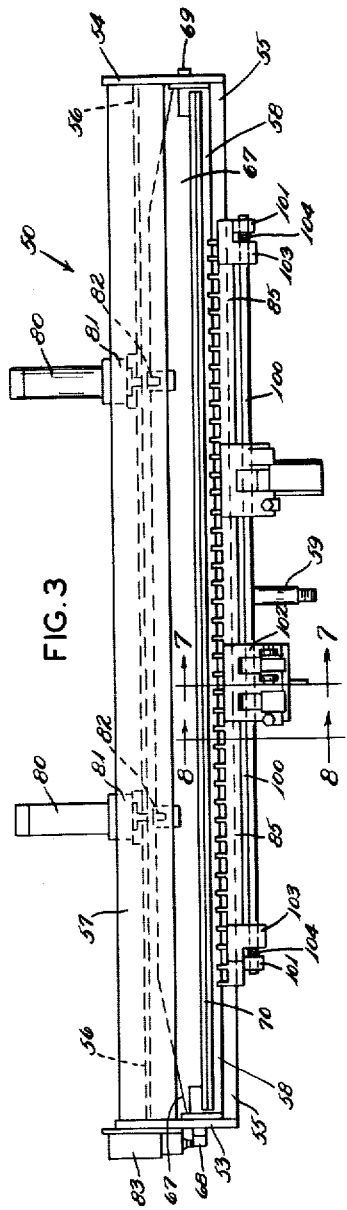

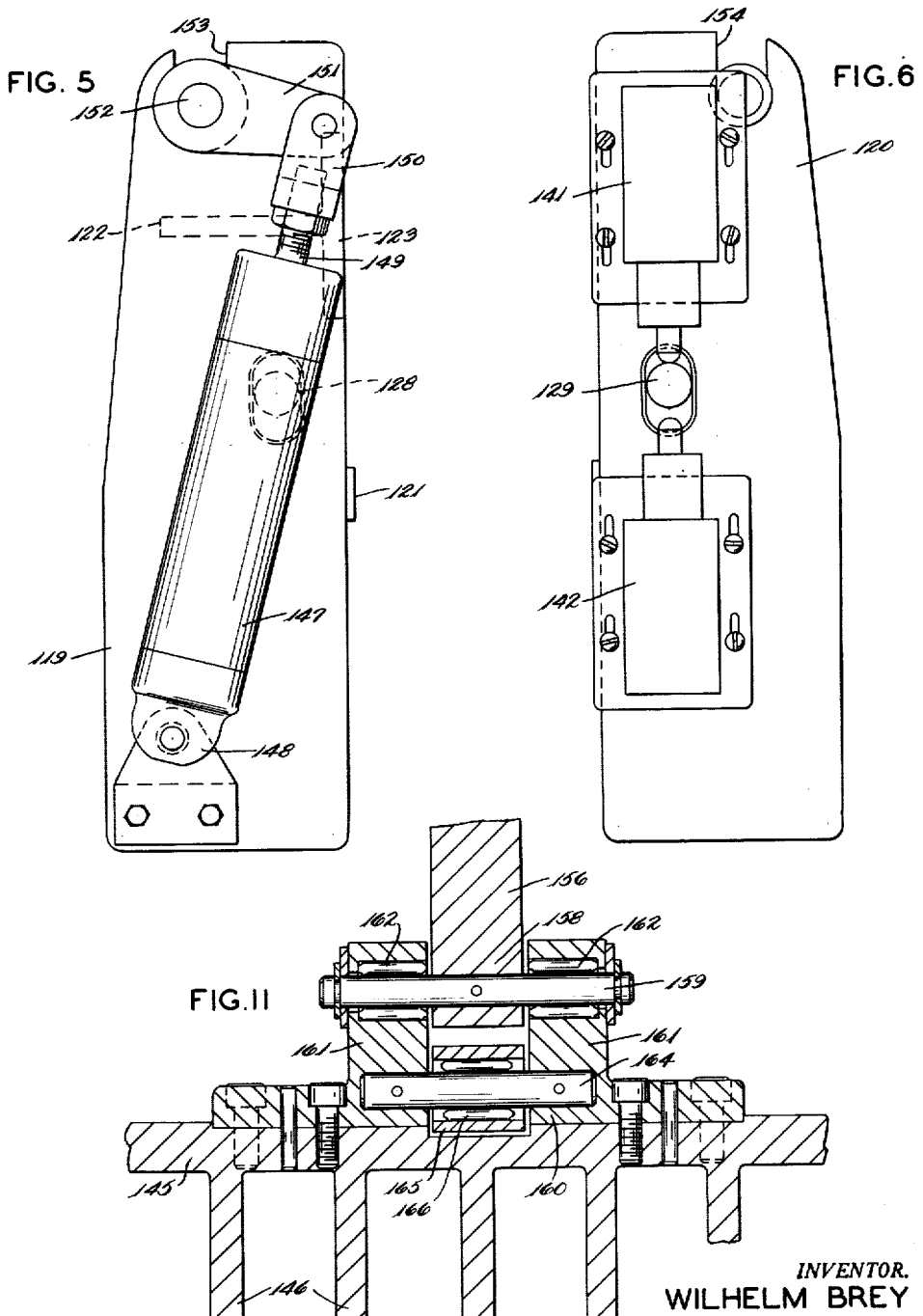

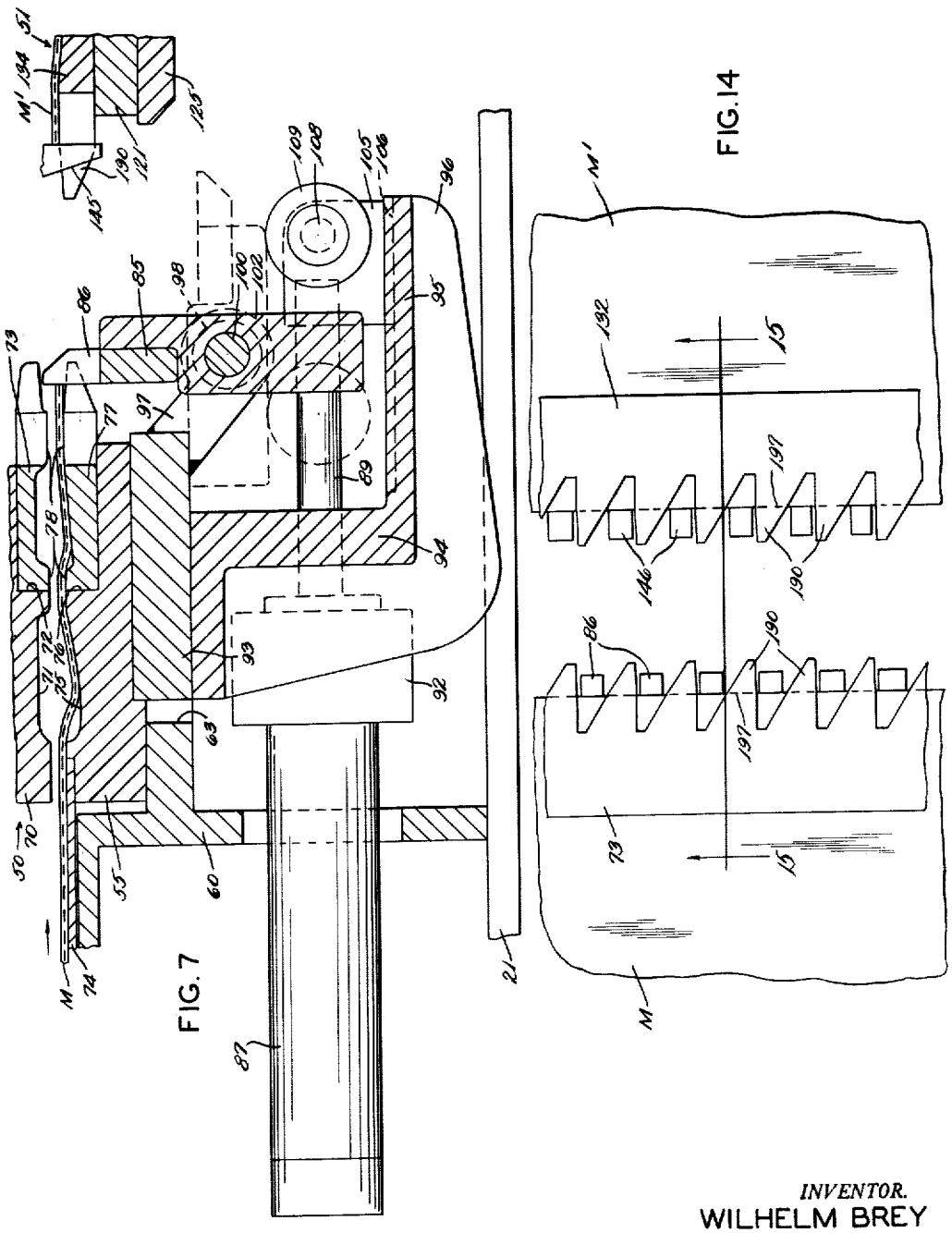

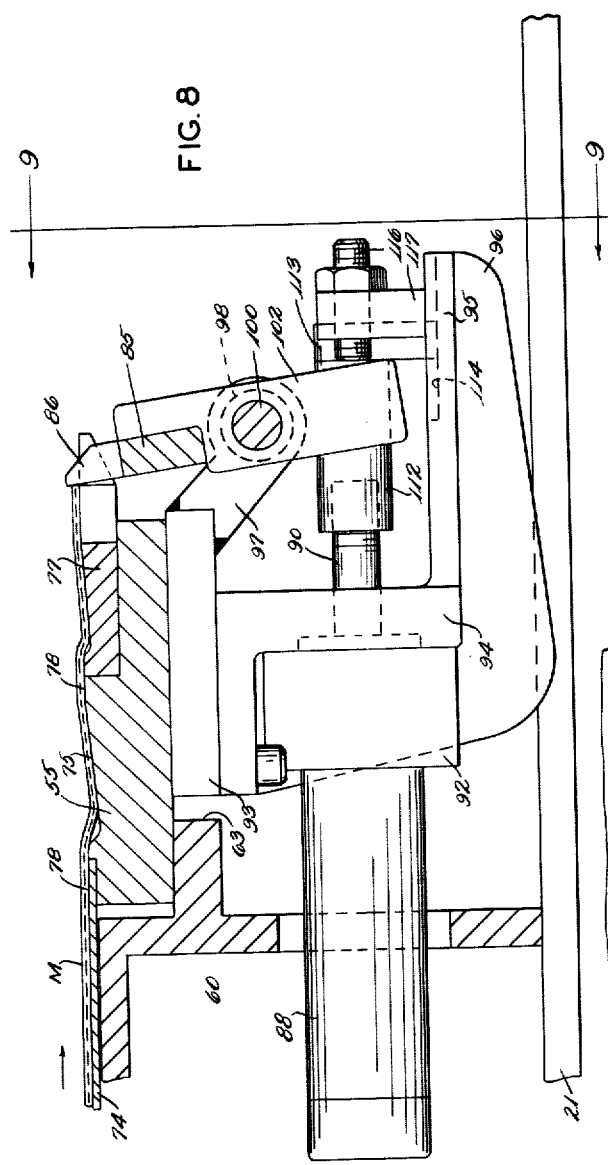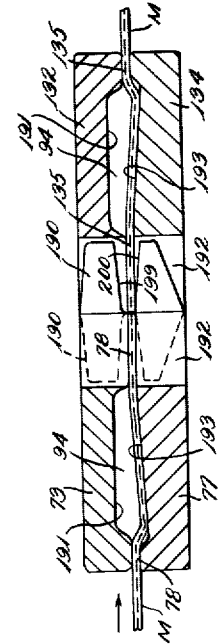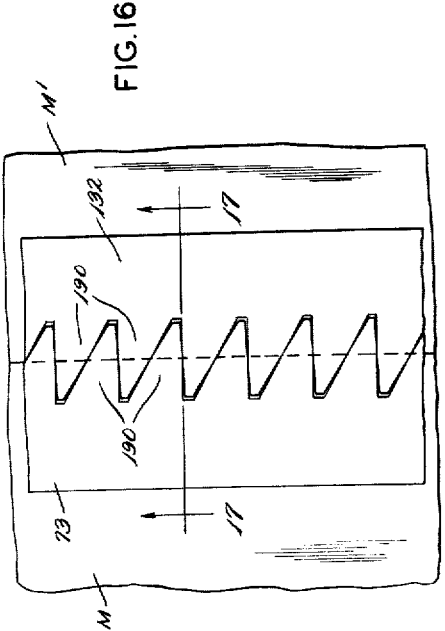

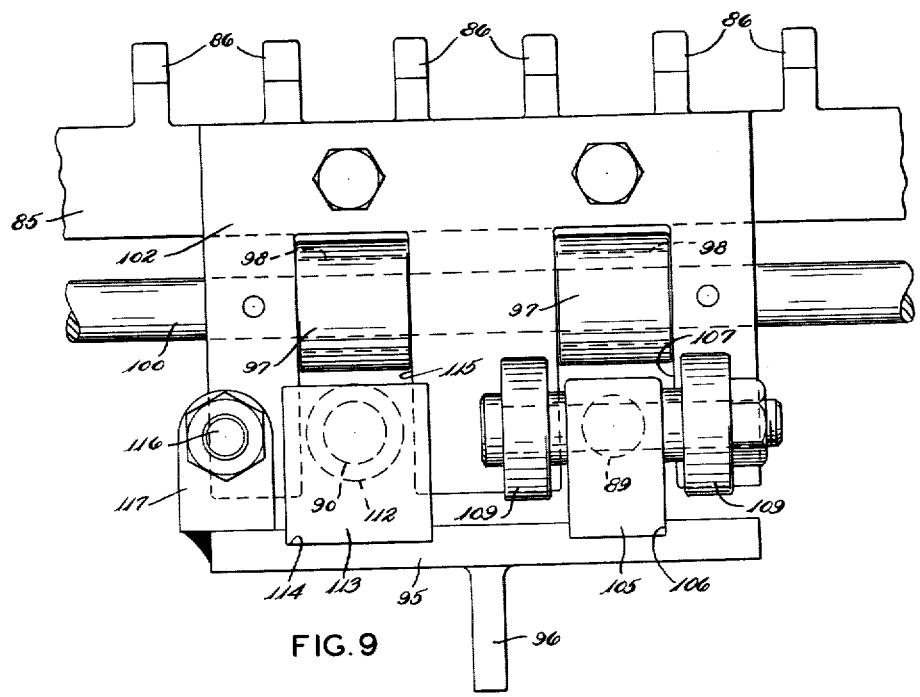

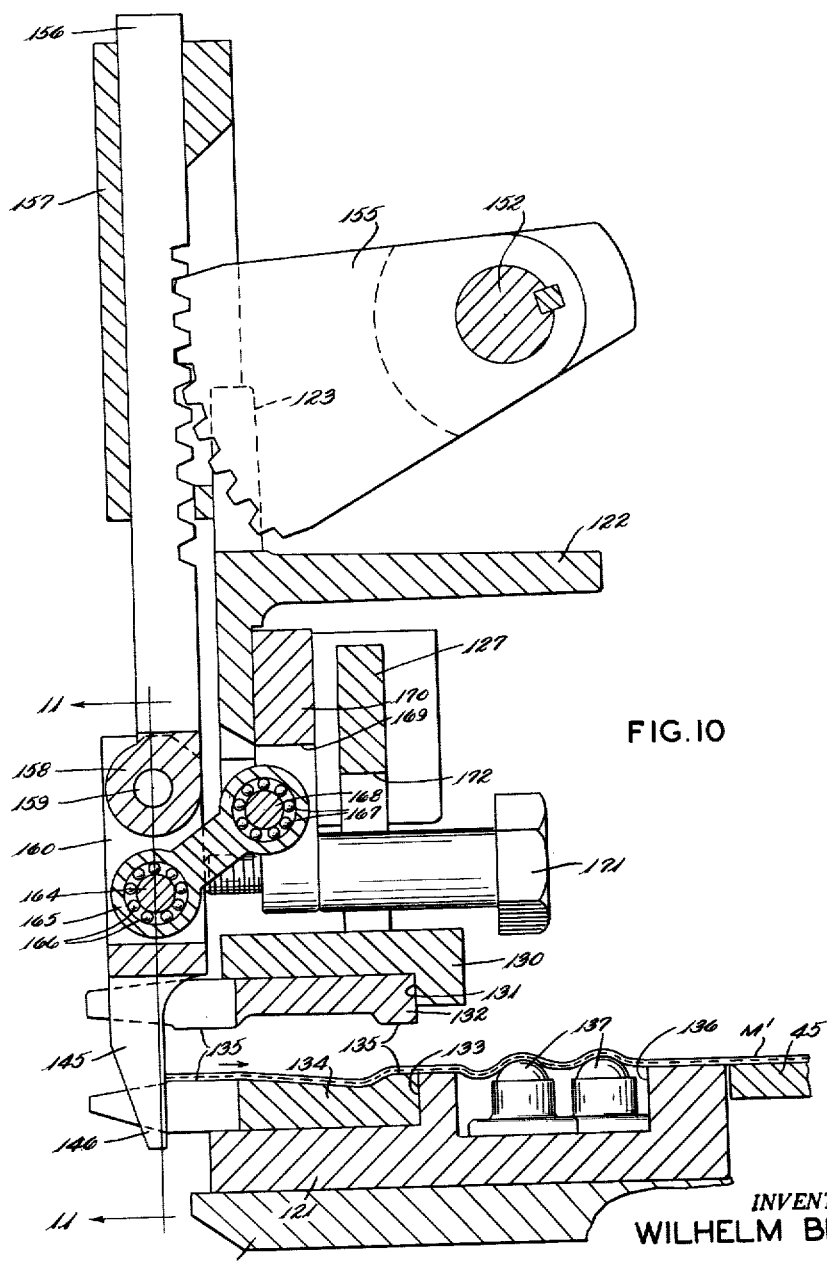

3,100,731
METHOD AND APPARATUS FOR JOINING
SHEET MATERIAL
Wilhelm Brey, Cuyahoga Falls, Ohio, assignor to The
Firestone Tire & Rubber Company, Akron, Ohio, a
corporation of Ohio
Filed Mar. 15, 1957, Ser. No. 646,459
26 Claims. (Cl. 156—157)

The present invention relates to apparatus for joining materials in sheet form. More particularly, the invention relates to apparatus for joining in an automatic manner the trailing end of one web of material to the leading end of a following web of material.

The apparatus of the invention was developed, and is particularly suited, for joining, splicing or stitching the ends of strips of self-adhesive rubberized fabric material used in the manufacture of articles such as automotive tires. As is well known, in the manufacture of rubberized fabric for use in tire construction, it is necessary to join short strips of rubberized fabric, which have been cut on a predetermined bias angle, to form long and continuous webs. Heretofore, the only practical way to build up continuous webs has been to manually overlap the ends of successive short strips and press the ends together. Such overlap splicing is costly and unless performed very accurately also may contribute to irregularity in the weight and balance of the finished tire.

Therefore, it is an object of the present invention to provide improved apparatus for joining materials in sheet form; particularly short lengths of rubberized tire fabric which have been cut on a predetermined bias angle.

It is a further object to provide apparatus which will automatically perform the functions necessary to butt joint or splice the trailing end of one web of material to the leading end of a following web of material, without building up the bulk of the fabric in the area of the splice and without undesirable damage to the material.

These and other objects of the invention, as well as the advantages thereof, will be apparent in view of the following description considered with the attached drawings.

In the drawings:

FIG. 1 is a plan view of apparatus embodying the invention;

FIG. 2 is an elevation of the apparatus shown in FIG. 1;

FIG. 3 is an enlarged elevation, taken substantially on line 3—3 of FIG. 1, showing the front or movable joining head;

FIG. 4 is an enlarged elevation, taken substantially on line 4—4 of FIG. 1, showing the rear or stationary joining head;

FIG. 5 is a further enlarged end view taken substantially on line 5—5 of FIG. 4;

FIG. 6 is an end view taken substantially on line 6—6 of FIG. 4;

FIG. 7 is an enlarged section taken substantially on line 7—7 of FIG. 3;

FIG. 8 is a section taken substantially on line 8—8 of FIG. 3;

FIG. 9 is a fragmentary front view of the structure shown in FIGS. 7 and 8;

FIG. 10 is an enlarged section taken substantially on line 10—10 of FIG. 4;

FIG. 11 is a front section taken substantially on line 11—11 of FIG. 10;

FIG. 12 is a plan view of the rear end of the apparatus table with both joining heads removed;

FIG. 13 is a section taken substantially on line 13—13 of FIG. 12;

FIG. 14 is a schematic plan view of the joining teeth when gripping the ends of the fabric webs;

FIG. 15 is an enlarged section taken substantially on line 15—15 of FIG. 14;

FIG. 16 is a view, similar to FIG. 14, when joining the fabric webs together;

FIG. 17 is a section taken substantially on line 17—17 of FIG. 16; and

FIG. 18 is an enlarged fragmentary plan view of the joining teeth when intermeshed.

The preferred form of apparatus according to the invention which is illustrated in the drawings, and indicated generally by the numeral 20, is intended to butt join or splice individual short length strips of rubberized fabric material, cut in the form of parallelograms with the ends having a predetermined bias angle (e.g. 30°), and form a long and continuous web. The apparatus 20 includes: a conveyor for the successive delivery of short length strips of material (M), means for winding the continuous web (M'); means for accurately positioning in abutment the leading end of a short strip and the trailing end of the continuous web; means for clamping the positioned ends; and movable cooperatively intermeshed toothed segments for joining the clamped ends in abutment so that the ends do not substantially overlap and the joint is for all practical purposes smooth and continuous.

The apparatus 20 includes a supporting frame 21 of suitable angle iron and plate construction. The top of the frame includes a generally rectangular box-like structure 22. Beneath the frame box 22 are mounted various switches, controls, a gear box and the front conveyor drive motor described below.

Referring to FIG. 1, the conveyor for short length strips of fabric M utilizes a multiple series of narrow width endless belts 24. At the front of the conveyor, each belt 24 is driven by an individual pulley 25 mounted on a common shaft 26 journaled in the frame box 22. One end of shaft 26 is fitted with a sprocket 27, connected by a chain 28 to another sprocket 29 on the output shaft of a gear box 30 driven by a two-speed electric motor 31. At the delivery end, each belt 24 rotates around an idler pulley 32. Between the belts 24, the frame box 22 has a cover plate 33.

Referring to FIGS. 1 and 2, the reel 34 for winding the continuous web of fabric M' is located longitudinally of the rear end of the frame box 22. The reel 34 is demountable and driven by an electric motor (not shown) in a conventional manner. As described below, it is desirable that the continuous web at certain times be wound at a fast rate on the reel 34. It is desirable at other times that the web be moved at a slower rate for accurate positioning of the trailing end. Such slow rate of movement is obtained by utilization of a web drive mounted in a bracket 35 on the end of the frame box 22.

On one side of the bracket 35 is mounted an electric motor 36 having a low output r.p.m. (e.g. 24 r.p.m.). The motor 36 drives a roll 37 journaled in the bracket 35. Opposite of the motor connection, the roll 37 is fitted with an overrunning clutch 38. Above the roll 37, a shaft 39 is journaled in slots 40 in the bracket 35. A hold down roll 41 is mounted on the shaft 39 so as to be in contact with the roll 37. The roll 41 is covered with a material, such as foam rubber, which will frictionally engage the continuous web M' without injury thereto. To the rear of shaft 39, another shaft 42 is journaled in the bracket 35. Attached to either end of the shaft 42 is a lever arm 43. The levers 43 extend downwardly below the slot 40 and beneath the ends of shaft 39. The levers 43 are used to lift the hold down roll 41 from contact with the roll 37 when a web of fabric is being manually threaded therethrough after changing a reel 34.

The rear portion of the frame box 22 is provided with a cover plate 45, the upper surface of which is treated so that the web of fabric will not stick thereto. A pair of side guides 46 and 47, positioned by hand wheels 48 and 49, are adjustable over the surface of plate 45 to prevent lateral movement of the continuous web M'.

The apparatus 20 employs a pair of cooperative joining heads to accurately position, clamp and splice the leading end of a short length strip of material M to the trailing end of a continuous web of material M' (FIG. 7). The front or movable head, that is the structure which positions and clamps the successive strips M delivered by the conveyor belts 24, is indicated generally at 50. The rear or stationary head, which positions and clamps the trailing end of the continuous web M' being wound on reel 34, is indicated generally at 51.

Referring to FIG. 3, the front head 50 includes an elongated rectangular structural member having vertical end plates 53 and 54 connected by a transverse base plate 55, medial plate 56 and face plate 57. Between the base plate 55 and the medial plate 56 is a throat, indicated at 58, through which the material passes. At approximately the midpoint of baseplate 55 is a head pivot and support pin 59.

Referring to FIGS. 12 and 13, at the trailing edge of the front cover plate 33, a stepped down movably mounted front head support table 60 extends diagonally across the frame box 22. The support table 60 has a bore 61 to receive the pivot pin 59. The support table also has a pair of angular slots 62 intended to receive bolts depending from the baseplate 55 so that the head 50, rotatable on the pivot pin 59, may be locked in a position corresponding to the bias angle of the fabric ends. The support table is further provided with relieved areas 63, 64 and 65 for clearance of certain elements of the apparatus as described below.

Referring again to FIG. 3, the front head 50 also includes a generally rectangular clamp frame 67 having bearing pins 68 and 69, on either end. The end plates 53 and 54 are provided with short vertical slots to receive pins 68 and 69, respectively, allowing vertical movement of the clamp frame, as described below. An upper clamp bar 70 is attached to the underside of the frame 67 longitudinally thereof.

Referring to FIG. 7, the front portion of the undersurface of the clamp bar 70 is provided with a recess 71 generally rectangular in cross section which extends longitudinally of the bar, and facilitates positioning of the leading end of a strip of material M. The rear portion of the undersurface of the clamp bar is provided with a shouldered recess 72, also extending the length of the clamp bar, which receives the front upper segment 73 of the cooperative joining teeth. The clamp bar 70 is opposed by the head baseplate 55, resting on the support table 60. The upper surface of the baseplate 55 is provided with a forwardly extending slide plate 74, an upwardly sloping recess 75 matching recess 71, and a shouldered recess 76 matching recess 72. The toothed upper segment 73 is opposed by a similar lower segment 77 received in recess 76. The material M is clamped between the toothed segments in the areas indicated at 78.

Referring again to FIG. 3, the clamping action is obtained by a pair of fluid operated cylinders 80 mounted vertically by flanges 81 attached to the upper side of the medial plate 56. The piston rod 82 of each cylinder 80 is connected to the upper edge of the clamp frame 67. When the cylinders 80 are energized to raise or lower the clamp frame 67, a limit switch 83 mounted on end plate 53 is actuated by pin 68.

Referring to FIGS. 7 to 9, the leading end of material M is accurately positioned on the exact predetermined bias angle between the segments 73 and 77, and their clamping areas 78, by a pivotable stop fence 85. The stop fence 85 has a series of spaced teeth 86 which interfit between the teeth of segments 73 and 77 (see FIG. 14). Movement of the stop 85 is controlled by a fluid operated long stroke cylinder 87 and short stroke cylinder 88. The two cylinders have rearwardly extensible piston rods 89 and 90, respectively. The cylinders are mounted in a block 92 which is part of a support bracket having a top plate 93 attached to the underside of the head baseplate 55. The bracket also includes a flange 94, depending from the top plate 93, and a rearwardly directed platform 95. The bracket structure is reinforced by an L-shaped under strut 96.

Depending from the rear edge of the bracket top plate 93 are a pair of rearwardly inclined bearing supports 97. The supports 97 are fitted with anti-friction bearings 98 which rotatably mount the medial portion of a shaft 100 extending longitudinally of the head 50. As shown in FIG. 3, the ends of the shaft 100 are journaled in a pair of outboard bearing supports 101. The medial portion of the shaft 100 carries a stopholder 102. Each end of the shaft carries an outboard stopholder 103. The stop fence 85 is attached to the upper forward surface of the stopholders 102 and 103. The relieved area 64 in the support table 60 provides clearance for movement of the right hand support 101 and holder 103 when the bias angle of the heads 50 and 51 is adjusted. Between each support 101 and holder 103 is a coiled spring 104 having its opposite ends secured to said support and holder for biasing the shaft 100 so that the stop fence 85 is always tending to move in a forward direction toward the head baseplate 55.

As shown in FIGS. 7 and 9, the stop fence 85 is pivoted rearwardly and lowered, compressing the coiled springs 104, by retraction of the normally extended rod 89 of piston 87. The outer end of the rod 89 is fitted with a block 105 which slides in a groove 106 in the platform 95 through a clevis opening 107 in the stopholder 102. The block 105 has a pin 108 therethrough which is fitted at each end with an anti-friction bearing 109. When the piston rod 89 is retracted, the bearings 109 contact the holder 102 and move the stopfence 85 rearwardly and down to the broken line position as shown in FIG. 7.

As shown in FIGS. 8 and 9, the stop fence 85 is caused to pivot forwardly by the coiled springs 104 when the normally retracted rod 90 of piston 88 is extended. The outer end of the rod 90 is fitted with a sleeve 112 terminating in a vertical block 113 which slides in a groove 114 in the platform 95. The sleeve 112 extends through a clevis opening 115 in the stopholder 102 and when the rod 90 is extended, the action of the springs 104 will move the stop fence 85 forwardly to the position as shown in FIG. 8. The forward movement of the stop fence is adjustably limited by a set screw 116 mounted in a bracket 117 on the platform 95 which contacts the stopholder 102.

Referring to FIG. 4, the rear head 51 includes an elongated rectangular structural member having vertical end plates 119 and 120 connected by a transverse base plate 121, medial plate 122 and face plate 123. Between the base plate 121 and the medial plate 122 is a throat, indicated at 124, through which the material passes.

Referring to FIG. 12, at the leading edge of the rear cover plate 45, a stepped down rigidly mounted rear head support table 125 extends diagonally across the frame box 22. The support table 125 has three angular slots 126 intended to receive bolts depending from the base plate 121 so that the head 51 may be locked in a position corresponding to the bias angle of the fabric end.

Referring again to FIG. 4, the rear head 51 also includes a generally rectangular clamp frame 127 having bearing pins 128 and 129, on either end. The end plates 119 and 120 are provided with short vertical slots to receive pins 128 and 129, respectively (FIGS. 5 and 6). The slots which receive pins 128 and 129 are similar to the slots in end plates 53 and 54 which receive pins 68 and 69 of front clamp frame 67. An upper clamp bar 130 is attached to the underside of frame 127 longitudinally thereof.

Referring to FIG. 10, the front portion of the undersurface of the clamp bar 130 is provided with a longitudinally extending shouldered recess 131 which receives the rear upper segment 132 of the cooperative joining teeth. The clamp bar 130 is opposed by the head baseplate 121 resting on the support table 125. The upper front surface of the baseplate 121 is provided with a shouldered recess 133, matching recess 131, which receives the lower rear segment 134 of the joining teeth. The material M' is clamped between the toothed segments 132 and 134 in the areas indicated at 135. The rear upper surface of the baseplate 121 is provided with a slot 136 in which a plurality of ball casters 137 are mounted above the surface level of the cover plate 45.

Referring again to FIG. 4, the clamping action is obtained by a pair of fluid operated cylinders 138 mounted vertically by flanges 139 attached to the upper side of the medial plate 122. The piston rod 140 of each cylinder 138 is connected to the upper side of the clamp frame 127. When the cylinders 138 are energized to raise or lower the clamp frame 127, a pair of opposed limit switches 141 and 142 mounted on end plate 120 are actuated by pin 129 (FIG. 6).

As best shown in FIG. 10, the trailing end of material M' is accurately positioned on the exact predetermined bias angle between the segments 132 and 134 and the clamping areas 135 by a pivotable stop fence 145. The stop fence has a series of spaced teeth 146 which interfit between the teeth of the segments 132 and 134 (see FIG. 14).

Referring to FIG. 5, movement of the stop fence 145 is controlled by a fluid operated cylinder 147 which has a base clevis 148 pivotally mounted on end plate 119. The upwardly extensible piston rod 149 is fitted with a clevis 150 pivotally fastened to a lever 151. The lever 151 is attached to a shaft 152 which is journaled at one end in a slot 153 in end plate 120 and at the other end in a slot 154 in end plate 119.

Referring to FIGS. 4, 10 and 11, when the cylinder 147 is actuated, the resulting movement of the shaft 152 is transmitted to the stop fence 145 by linkage mechanism which includes three gear segments 155. Each gear segment 155 engages a vertically movable rack 156 carried by a rack guide 157 mounted on the front surface of the head face plate 123. The lower end of each rack 156 is provided with a boss 158 through which is inserted an upper pivot pin 159.

As best shown in FIG. 11, each pin 159 carries a stop holder 160 having identical clevis portions 161 which rotate upon anti-friction bearings 162 on the pin 159. Below the pin 159, is a second pivot pin 164 on which is mounted the lower end of a link 165 which rotates upon an anti-friction bearing 166.

Referring to FIG. 10, the upper end of each link 165 rotates upon an anti-friction bearing 167 mounted around a link pivot pin 168. The pivot pin 168 is mounted in the clevis opening 169 of a link bracket 170 attached to the head medial plate 122. Each bracket 170 is also provided with an adjustable screw 171, which extends through a slot 172 in the clamp frame 127 and contacts the stop holder 160 so as to limit inward movement of the stop fence 145.

Referring to FIGS. 12 and 13, the fronthead 50 and the support table 60 are moved toward the stationary rearhead 51 and the support table 125 by a pair of fluid operated cylinders 175 mounted within the box frame 22 beneath the rear cover plate 45. The end of the piston rod 176 of each cylinder is fastened in a push block 177 mounted on the rear undersurface of the support table 60.

The table structure of the apparatus 20 is strengthened by a support plate 178 beneath the box frame 22. The plate 178 is carried by three rods 179 each mounted between top blocks 180 and 181. The forward end of each rod 179 is supported by a hanger block 182 mounted on the forward undersurface of the table 60. The rear end of each outer rod 179 is supported by a push block 177. The rear end of the middle rod 179 is supported by a hanger block 183.

The bias angle of the heads 50 and 51 is changed by first extending the piston rods of cylinders 175 so that the heads are in contact with each other as shown in FIG. 1. The bolts depending through the slots 62 and 126 are then loosened. As shown in FIG. 12, a threaded shaft 185 is mounted in a pair of brackets 186 on one side of the box frame 22. A threaded block 187, having a lever 188 attached to the rear head baseplate 121, is fitted on the shaft 185. When the shaft 185 is rotated by a handwheel 189, the angle of the heads on their respective support tables, 60 and 125, can be simultaneously changed so that the heads are in parallelism with each other.

As best shown in FIG. 15, the front and rear toothed upper segments 73 and 132 are identical, each having a set of teeth 190 and a recess 191 generally rectangular in cross section extending longitudinally of the segment body. The lower segments 77 and 134 are also identical having a set of teeth 192 and an upwardly sloping recess 193 opposing recess 191. The areas 194 defined by the matching recesses 191 and 193 permit the ends of the material to be readily positioned by the stop fences. As shown in full lines, the material has been properly aligned by the stop fences 85 and 145 between the clamping areas 78 and 135. If the material is slightly out of position prior to alignment by the stop fences, the areas 194 will permit the material to change position slightly as shown in dotted lines.

The clamping areas of the cooperative teeth 190 and 192 are provided by substantially parallel surfaces 195 and 196, respectively, which clamp the material at locations beyond the segment clamping areas. The ends of the material are positioned between surfaces 195 and 196 by the stop fences 85 and 145. The surfaces 195 and 196 terminate at a line indicated at 197 extending longitudinally of the segment bodies. At the line 197 the undersurface of each tooth 190 is provided with a shoulder 198, and outwardly thereof with a divergent portion 199, inclined upwardly at an angle, for example, of 5°, so that the material may be joined without pinching or injury. Outwardly of the surface 196, the upper surface of each tooth 192 is provided with a divergent portion 200 inclined downwardly at an angle, for example, of 5°.

Referring to FIG. 18, the teeth 190 and 192 are identical in plan section. From the imaginary base line 201, a flat surface 202 extends outwardly at an angle, for example, of 29°45', terminating at a contact point 203A which is directly above line 197. Outwardly of contact point 203A, the surface 204 is inclined further, for example, an additional 3°. The surface 204 terminates in a short surface 205 which is substantially parallel with the base line 201.

On the other side of each tooth 190 or 192 is a flat surface 206 which is at right angles to the base line 201. The surface 206 terminates at a contact point 203B, which is also directly above line 197. Outwardly of contact point 203B, the surface 207 is inclined toward surface 205 at an angle, for example, of 3°.

Thus the teeth 190 and 192 have cooperative surfaces which abut only at contact points, 203A and 203B, which points preferably coincide with the ends of material clamped therebetween.

*Operation of the Apparatus and Controls Therefor*

The various elements of the apparatus 20, as described above, are actuated in timed sequences by suitable controls so that the leading end of the material M is joined to the trailing end of the material M' in an automatic manner.

An operating cycle of the apparatus includes the following steps:

(1) The belts 24 are run at high speed by the motor 31 to deliver a short strip of material M to the front head 50. The drive motor of the reel 34 is run at high speed to wind up the web of material M' previously joined.

(2) As the leading end of the material M approaches head 50, a conventional switch (not shown), located above the belts 24, actuates the motor 31 so that belts 24 are run at low speed.

(3) As the trailing end of the material M' passes beneath head 50 and approaches the rear head 51, a first photoelectric cell (not shown) is energized. The first photoelectric cell is mounted on the face plate 57 of head 50 and initiates—(a) stopping of the drive motor of reel 34 so that the motor 36 will drive the roll 37 at low speed and (b) extension of the rod 89 of piston 87 so that the teeth of the stop fence 85 are biased to a vertical position by the springs 104 (see FIG. 7).

(4) As the leading end of the material M is delivered at low speed through the throat 58 of head 50 and emerges between the teeth of segments 73 and 77, the first photoelectric cell is deenergized, which stops the belts 24 by completely stopping motor 31, preliminarily locating the leading edge of the material M.

(5) As the trailing end of the material M' approaches at low speed the throat 124 of head 51 and passes between the teeth of segments 132 and 134, a second photoelectric cell (not shown) is energized. The second photoelectric cell is mounted on the face plate 123 of head 51 and initiates—(a) stopping of the motor 36, preliminarily locating the trailing edge of M', (b) extension of the rod 90 of piston 88 so that the teeth of the stop fence 85 are biased forwardly so as to positively position the material M between the teeth of segments 73 and 77 (see FIG. 8), (c) extension of the rod 149 of cylinder 147 so that the teeth of the stop fence 145 are pivoted rearwardly around the pivot pin 168 so as to positively position the material M' between the teeth of segments 132 and 134 (see FIG. 10) and (d) starting of a timer (not shown) first delay period.

(6) After the first day, the timer initiates—(a) extension of the rods 82 of cylinders 80 so that the clamp bar 70 of head 50 is lowered so as to grip the material M at the areas 78, and (b) extension of the rods 140 of cylinders 138 so that the clamp bar 130 of head 51 is lowered so as to grip the material M' at the areas 135. The clamping action exerts sufficient squeezing pressure so that the bias cut ends of the material will each extend toward the other a slight distance, for example, 1/16 of an inch.

(7) After the clamping action, the timer further initiates—(a) retraction of the rods of cylinders 87 and 88 so as to lower the stop fence 85, and (b) retraction of the rod of cylinder 147 so as to raise the stop fence 145.

(8) After lowering stop fence 85 and raising stop fence 145, the timer further initiates retraction of the rods 176 of cylinders 175 so that head 50 is moved rearwardly into contact with head 51, the ends of material M and M' being abutted and joined (see FIG. 17), by the adhesion between the abutting edges of the two strips of material.

(9) After the material joining action, the timer further initiates retraction of the rods cylinders 80 and 138 so that the clamp bars 70 and 130 are raised, clearing throats 58 and 124.

(10) After the unclamping action, the timer further initiates—(a) extension of the rods of cylinders 175 so that the heads 50 and 51 are moved apart, (b) actuation of motor 31 so that belts 24 are run at high speed, and (c) starting the motor of reel 34 to run at high speed. The cycle is then repeated, beginning with step 1.

It is apparent that performance of steps 6 to 10 of the operating cycle, as controlled by a timer, should occur in the described sequence. Accordingly, suitable limit switches are preferably employed to monitor occurrence of the several cycle steps. For example, the limit switch 83 signals the completion of step 9. The limit switch 142 is employed to signal the timer that step 6 has been completed and step 7 may begin. Switch 141 also signals completion of step 9. Referring to FIG. 3, a switch 210 actuated by rotation of the shaft 100 signals completion of step 7. These and other controls will readily suggest themselves to those skilled in the art.

While a preferred embodiment of apparatus, especially adapted for joining tire fabric on the bias angle, has been shown and described it is apparent that other self-adhesive materials could also be joined. Also, the invention has proven satisfactory for joining tire fabric in which the reinforcing elements comprise wires or cables, rather than fabric. Therefore, the scope of the invention is limited only by the subjoined claims.

What is claimed is:

1. Apparatus for joining the leading end of a length of material to the trailing end of a continuous web of material, comprising, means for linearly moving said web, means for linearly moving successive lengths of material toward said web, relatively movable upper and lower clamping means for said leading and trailing ends, means for positioning said leading and trailing ends between said clamping means in exact parallelism with each other, means for actuating said clamping means to positively clamp said leading and trailing ends in said positions, means for moving the clamping means linearly relative to each other to abut said positively clamped leading and trailing ends, and intermeshing teeth on said clamping means to accurately position said ends in continuous uniform abutment.

2. Apparatus for joining the leading end of a length of material to the trailing end of a continuous web of material, comprising, means for linearly moving said web, means for linearly moving successive lengths of material toward said web, relatively movable upper and lower clamping means for said leading and trailing ends, retractable stop fences for positioning said leading and trailing ends between said clamping means in exact parallelism with each other, means for actuating said clamping means to positively clamp said leading and trailing ends in said position, means for moving the clamping means linearly relative to each other to abut said leading and trailing positively clamped ends, and intermeshing teeth on said clamping means to accurately position said ends in continuous uniform abutment.

3. Apparatus for joining the leading end of a length of material to the trailing end of a continuous web of material, comprising, means for linearly moving said web, means for linearly moving successive lengths of material toward said web, relatively movable upper and lower clamping means for said leading and trailing ends, retractable stop fences for positioning said leading and trailing ends between said clamping means in exact parallelism with each other, means for actuating said clamping means to positively clamp said leading and trailing ends in said positions, means for moving the clamping means linearly relative to each other to abut said leading and trailing ends, and intermeshing teeth on said clamping means to accurately position said positively clamped ends in continuous uniform abutment, said stop fences interfitting between said teeth before and during said clamping action.

4. Apparatus for joining the ends of successive lengths of sheet material to form a continuous web of material, comprising, the combination of: a support frame; a stationary joining head mounted across said frame; a movable joining head mounted across said frame; each of said heads including end plates and a base plate and an upper plate extending therebetween, a clamp movable in said end plates above said base plate, a toothed upper segment on the underside of said clamp, an opposed toothed lower segment on the upper side of said base plate, and means on said upper plate for actuating said clamp so that said upper and lower segments are engaged; means on said frame for delivery of a strip of material between one opposed pair of toothed segments; means on said frame for linearly moving said continuous web away from said heads; and means on said frame for linearly sliding said movable head toward said stationary head when said clamps are actuated so that the two pairs of toothed segments are cooperatively intermeshed for positioning the ends of the material in continuous uniform abutment.

5. Apparatus for joining the ends of successive lengths of sheet material to form a continuous web of material, comprising, the combination of: a support frame; a stationary joining head mounted across said frame; a movable joining head mounted across said frame; each of said heads including end plates and a base plate and an upper plate extending therebetween, a clamp movable in said end plates above said base plate, a toothed upper segment on the underside of said clamp, an opposed toothed lower segment on the upper side of said base plate, and means on said upper plate for actuating said clamp so that said upper and lower segments are engaged; means on said frame for delivery of a strip of material between one opposed pair of toothed segments; means on said frame for linearly moving said continuous web away from said heads; means associated with said heads for positioning the leading end of a short length of material in parallelism with the trailing end of the web of material beneath said clamps; and means on said frame for linearly sliding said movable head toward said stationary head when said clamps are actuated so that the two pairs of toothed segments are cooperatively intermeshed for positioning the ends of the material in continuous uniform abutment.

6. Apparatus for joining the ends of successive lengths of sheet material to form a continuous web of material, comprising the combination of: a support frame; a movable front head mounted diagonally of said frame; a stationary rear head mounted diagonally of said frame; each of said heads including end plates and a base plate and an upper plate extending therebetween, a clamp movable in said end plates above said base plate, a toothed upper segment on the underside of said clamp, an opposed toothed lower segment on the upper side of said base plate and means on said upper plate for actuating said clamp so that said upper and lower segments are engaged; means on said frame for delivery of a strip of material between the opposed toothed segments of said front head; means on said frame for linearly moving said continuous web away from said heads; means associated with said heads for positioning the leading end of a length of material in parallelism with the trailing end of the web of material beneath said clamps; and means on said frame for linearly sliding said movable head toward said stationary head when said clamps are actuated so that the two pairs of toothed segments are cooperatively intermeshed for positioning the ends of the material in continuous uniform abutment.

7. Apparatus for joining the ends of successive lengths of sheet material to form a continuous web of material, comprising the combination of: a support frame; a movable front head mounted diagonally of said frame; a stationary rear head mounted diagonally of said frame; each of said heads including end plates and a base plate and an upper plate extending therebetween, a clamp movable in said end plates above said base plate, a toothed upper segment on the underside of said clamp, an opposed toothed lower segment on the upper side of said base plate, and means on said upper plate for actuating said clamp so that said upper and lower segments are engaged; means on said frame for adjustment of said heads in parallelism with each other; means on said frame for delivery of a length strip between the opposed toothed segments of said front head; means on said frame for linearly moving said continuous web away from said heads; means associated with said heads for positioning the leading end of a length of material in parallelism with the trailing end of the web of material beneath said clamps; and means on said frame for linearly sliding said movable head toward said stationary head when said clamps are actuated so that the two pairs of toothed segments are cooperatively intermeshed for positioning the ends of the material in continuous uniform abutment.

8. Apparatus for joining the ends of successive lengths of sheet material to form a continuous web of material, comprising the combination of: a support frame; a movable front head mounted diagonally of said frame; a stationary rear head mounted diagonally of said frame; each of said heads including end plates and a base plate and an upper plate extending therebetween, a clamp movable in said end plates above said base plate, a toothed upper segment on the underside of said clamp, an opposed toothed lower segment on the upper side of said base plate, means on said upper plate for actuating said clamp so that said upper and lower segments are engaged, a stop fence having teeth which interfit between said upper and lower toothed segments, and means for moving said stop fence toward and away from said base plate; means on said frame for adjustment of said heads in parallelism with each other; means on said frame for delivery of a length strip between the opposed toothed segments of said front head; means on said frame for linearly moving said continuous web away from said heads; and means on said frame for linearly sliding said front head toward said rear head so that the two pairs of opposed toothed segments are cooperatively intermeshed for positioning the ends of the material in continuous uniform abutment.

9. Apparatus for joining the ends of successive lengths of sheet material to form a continuous web of material, comprising the combination of: a support frame; a stationary joining head mounted across said frame; a movable joining head mounted across said frame; each of said heads including end plates and a base plate and an upper plate extending therebetween, a clamp movable in said end plates above said base plate, a toothed upper segment on the underside of said clamp, an opposed toothed lower segment on the upper side of said base plate, and means on said upper plate for actuating said clamp so that said upper and lower segments are engaged; means on said frame for delivery of a length strip of material between one opposed pair of toothed segments; means on said frame for moving said continuous web away from said heads; a stop fence pivotally mounted below the base plate of said movable head; a stop fence pivotally mounted above the base plate of said stationary head; each of said stop fences having teeth which interfit between said opposed pairs of toothed segments for aligning the ends of said material in exact parallelism with each other; means for moving said stop fences toward and away from the respective base plates; and means on said frame for linearly sliding said movable head toward said stationary head when said clamps are actuated so that the two pairs of toothed segments are cooperatively intermeshed for positioning the ends of the material in continuous uniform abutment.

10. In apparatus employing cooperative toothed segments for joining the ends of successive lengths of sheet material to form a continuous web of material, the combination of: a support frame; a stationary joining head mounted across said frame; a movable joining head mounted across said frame; each of said heads including end plates and a base plate and an upper plate extending therebetween, a clamp movable in said end plates above said base plate, and means on said upper plate for moving said clamp toward said base plate; means on said frame for delivery of a strip of material beneath one of said clamps; means on said frame for moving said continuous web linearly away from said heads and positioning the trailing end of said web beneath the other said clamp; intermeshing toothed upper segments attached to each clamp; intermeshing toothed lower segments attached to each base plate; and means on said frame for sliding said movable joining head linearly toward said stationary head so that said toothed segments are intermeshed with the clamped ends of the material in continuous abutment.

11. In apparatus employing cooperative toothed segments for joining the ends of successive lengths of sheet material to form a continuous web of material, the combination of: a support frame; a stationary joining head mounted across said frame; a movable joining head mounted across said frame; each of said heads including end plates and a base plate and an upper plate extending therebetween, a clamp movable in said end plates above said base plate and means on said upper plate for moving said clamp toward said base plate; means on said frame for delivery of a strip of material beneath one of said clamps; means on said frame for moving said continuous web linearly away from said heads and moving the trailing end of said web beneath the other said clamp; means associated with said heads for positioning the leading end of a length of material in exact parallelism with the trailing end of the web of material; intermeshing toothed upper segments attached to each clamp; intermeshing toothed lower segments attached to each base plate; and means on said frame for sliding said movable joining head linearly toward said stationary head so that said toothed segments are intermeshed with the clamped ends of the material in continuous abutment.

12. In apparatus employing cooperative toothed segments for joining the ends of successive lengths of sheet material to form a continuous web of material the combination of: a support frame; a movable front head mounted diagonally of said frame; a stationary rear head mounted diagonally of said frame; each of said heads including end plates and a base plate and an upper plate extending therebetween, a clamp movable in said end plates above said base plate and means on said upper plate for moving said clamp toward said base plate; means on said frame for delivery of a strip beneath the clamp of said front head; means on said frame for moving said continuous web linearly away from said heads and moving the trailing end of said web beneath the other said clamp; means associated with said heads for positioning the leading end of a length of material in parallelism with the trailing end of the web of material; intermeshing toothed upper segments attached to each clamp; intermeshing toothed lower segments attached to each base plate; and means on said frame for linearly sliding said movable joining head toward said stationary head so that said toothed segments are intermeshed with the clamped ends of the material in continuous abutment.

13. In apparatus employing cooperative toothed segments for joining the ends of successive lengths of sheet material to form a continuous web of material, the combination of: a support frame; a stationary joining head mounted across said frame; a movable joining head mounted across said frame; each of said heads including end plates and a base plate and an upper plate extending therebetween, a clamp movable in said end plates above said base plate and means on said upper plate for moving said clamp toward said base plate; means on said frame for adjustment of said heads in parallelism with each other; means on said frame for delivery of a length strip of material beneath the clamp of said front head; means on said frame for linearly moving said continuous web away from said heads and moving the trailing end of said web beneath the other said clamp; means associated with said heads for positioning the leading end of a length of material in exact parallelism with the trailing end of the web of material; intermeshing toothed upper segments attached to each clamp; intermeshing toothed lower segments attached to each base plate; and means on said frame for linearly sliding said movable joining head toward said stationary head so that said toothed segments are intermeshed with the clamped ends of the material in continuous abutment.

14. The method of butt splicing the edges of two lengths of rubberized fabric comprising, positively clamping one edge along spaced segments, positively clamping the other along spaced segments, and bringing the two edges, while thus clamped, forcibly together with the positively clamped segments of one edge engaging the unclamped segments of the other edge.

15. Apparatus for butt splicing the edges of two lengths of rubberized fabric comprising, a pair of jaws positively clamping one edge along spaced segments and a second pair of jaws positively clamping the other edge along spaced segments and means to bring said pairs of jaws together and urge said positively clamped edges into forcible engagement with the clamped segments of one edge in contact with the unclamped segments of the other edge.

16. Apparatus according to claim 15 in which each of said jaws has a serrated gripping surface.

17. Apparatus according to claim 16 in which said gripping serrations have at least one surface tapered toward said edges.

18. Apparatus according to claim 15 in which the gripping surfaces of said pairs of jaws include a plurality of laterally spaced teeth, with the teeth of one pair of jaws intermeshing with the teeth of the other pair and with said edges gripped by said teeth intermediate the ends and the bases thereof.

19. Apparatus according to claim 15 in which the gripping surfaces of said pairs of jaws include a plurality of laterally spaced teeth, with the teeth of one pair of jaws intermeshing with the teeth of the other pair at points coinciding with the splice line of said two lengths a fabric.

20. Apparatus for accurately positioning the edge of a length of rubberized fabric which comprises a surface supporting said edge portion and terminating with a series of spaced teeth, means interfitting between said teeth and movable toward said surface so as to move the edge of said fabric inwardly thereon, said surface having a recess parallel to said edge permitting said fabric to distort as said edge is moved.

21. Apparatus for splicing two lengths of rubberized fabric comprising a reel for said first length of material, means for stopping said reel with the trailing edge of said material adjacent to but wholly back of a first reference line, first positioning means for forcibly moving said trailing edge ahead to said first reference line, a delivery means for said second length of material, means for stopping said delivery means with the leading edge of said material adjacent to but wholly ahead of a second reference line, second positioning means for forcibly moving said leading edge back to said second reference line, clamping means for securely gripping each of said edges, and means for bringing said clamped edges, while thus clamped, forcibly together.

22. The method of splicing two lengths of rubberized fabric comprising preliminarily locating the trailing edge of said first length adjacent to but wholly back of a first reference line, positively forcing said trailing edge ahead to said first reference line, preliminarily locating the leading edge of said second length adjacent to but wholly ahead of a second reference line, positively forcing said leading edge back to said second reference line, positively clamping said trailing edge along spaced segments at said first reference line, positively clamping the said leading edge along spaced segments at said second reference line and bringing the two edges, while thus clamped, together with the positively clamped segments of one edge engaging the unclamped segments of the other edge.

23. The method of claim 14, in which said two edges are brought together through a fixed distance.

24. The method of claim 14, in which said edges are initially positioned in accurately spaced parallel relationship and are brought together through a fixed stroke.

25. Apparatus as in claim 15, said means to bring said pairs of jaws together being moveable through a fixed stroke.

26. Apparatus as in claim 15, and locating means to initially position said edges accurately and in parallel relationship, said means to bring said pairs of jaws together being moveable through a fixed stroke.

References Cited in the file of this patent
UNITED STATES PATENTS

| | | |
|---|---|---|
| 1,043,143 | Raymond | Nov. 5, 1912 |
| 2,254,596 | Breth et al. | Sept. 2, 1941 |
| 2,487,149 | Leguillon | Nov. 8, 1949 |
| 2,534,252 | Engler | Dec. 19, 1950 |
| 2,688,996 | Loomis | Sept. 14, 1954 |

UNITED STATES PATENT OFFICE
CERTIFICATE OF CORRECTION

Patent No. 3,100,731                            August 13, 1963

Wilhelm Brey

It is hereby certified that error appears in the above numbered patent requiring correction and that the said Letters Patent should read as corrected below.

Column 7, line 45, for "day" read -- delay --; line 67, after "rods" insert -- of --; column 8, line 49, strike out "positively clamped" and insert the same after "said" in line 51, same column 8.

Signed and sealed this 7th day of April 1964.

(SEAL)
Attest:

ERNEST W. SWIDER

Attesting Officer

EDWARD J. BRENNER

Commissioner of Patents